United States Patent
Gudmundsson et al.

(10) Patent No.: US 12,455,246 B2
(45) Date of Patent: Oct. 28, 2025

(54) METHOD AND APPARATUS FOR QUANTITATIVE CHEMICAL ANALYSIS OF LIQUID METALS AND ALLOYS

(71) Applicant: DTE EHF., Reykjavik (IS)

(72) Inventors: Sveinn Hinrik Gudmundsson, Mosfellsbaer (IS); Kristjan Leosson, Reykjavik (IS)

(73) Assignee: DTE EHF., Reykjavik (IS)

( * ) Notice: Subject to any disclaimer, the term of this patent is extended or adjusted under 35 U.S.C. 154(b) by 28 days.

(21) Appl. No.: 18/255,392

(22) PCT Filed: Dec. 2, 2021

(86) PCT No.: PCT/EP2021/084060
§ 371 (c)(1),
(2) Date: Jun. 1, 2023

(87) PCT Pub. No.: WO2022/117768
PCT Pub. Date: Jun. 9, 2022

(65) Prior Publication Data
US 2024/0094133 A1     Mar. 21, 2024

(30) Foreign Application Priority Data

Dec. 2, 2020   (EP) .................................... 20211367

(51) Int. Cl.
*G01N 21/71*      (2006.01)
*G01N 33/205*    (2019.01)
*G01N 21/15*      (2006.01)

(52) U.S. Cl.
CPC ......... *G01N 21/718* (2013.01); *G01N 33/205* (2019.01); *G01N 2021/151* (2013.01)

(58) Field of Classification Search
CPC ............... G01N 21/718; G01N 33/205; G01N 2021/151
See application file for complete search history.

(56) References Cited

U.S. PATENT DOCUMENTS

2003/0234928 A1   12/2003   Lucas

FOREIGN PATENT DOCUMENTS

| EP | 0184590 A1 | 6/1986 |
|---|---|---|
| WO | 2007012440 A1 | 2/2007 |

OTHER PUBLICATIONS

"Improvements in Quantitative Analysis of Steel Composition by Laser-Induced Breakdown Spectroscopy at Atmospheric Pressure Using an Infrared Nd: YAG Laser", Applied Spectroscopy, 1999, by Aragon et al. (Year: 1999).*

(Continued)

*Primary Examiner* — Jamil Ahmed
(74) *Attorney, Agent, or Firm* — Tarolli, Sundheim, Covell & Tummino LLP

(57) ABSTRACT

A modified method and apparatus for measuring elements in a liquid metal or alloy sample (23) with Laser Induced Breakdown Spectroscopy (LIBS). The apparatus comprises a pulsed excitation laser (1) and an instrument head (6) comprising a laser path channel (10), laser excitation optics (2), receiving optics for receiving emission from a plasma (3) created by the interaction of the laser (1) and the sample (23), an open-bottom chamber (5) extending upwardly from a flat bottom surface (7) of the instrument head (6), the laser path channel (10) extending to said chamber (5), and preferably a gas channel (12) for feeding gas to the open-bottom chamber (5). The laser (1) and laser excitation optics (2) are configured such that when the instrument head (6) is at a distance from a sample surface in the range of 1-10 mm, the focal point of the pulsed excitation laser is beneath the sample surface at a distance which is more than one Rayleigh length of the focused excitation laser beam.

16 Claims, 9 Drawing Sheets

(56) References Cited

OTHER PUBLICATIONS

"Rapid in-situ analysis of liquid steel by laser-induced breakdown spectroscopy", Spectrochimica Acta Part B 56 (2001) 685-693, by Gruber et al. (Year: 2001).*
"High temperature fiber optic laser-induced breakdown spectroscopy sensor for analysis of molten alloy Constituents", American Institute of Physics, 2002, by Rai et al. (Year: 2002).*
Extended European Search Report dated May 25, 2021 for corresponding EP Application No. 20211367.6.
International Search Report and Written Opinion dated Feb. 18, 2022 for corresponding International Application No. PCT/EP2021/084060.
Aragon, et al. "Improvements in Quantitative Analysis of Steel Composition by Laser-Induced Breakdown Spectroscopy at Atmospheric Pressure Using an Infrared Nd:YAG Laser" (1999) Applied Spectroscopy, vol. 53, No. 10, pp. 1259-1267 doi: 10.1366/0003702991945506.
Rai, et al. "High temperature fiber optic laser-induced breakdown spectroscopy sensor for analysis of molten alloy constituents" (2002) Review of Scientific Instruments, vol. 73, No. 10, pp. 3589-3599 doi:10.1063/1.1505101.
Gruber, et al. "Rapid in-situ analysis of liquid steel by laser-induced breakdown spectroscopy" (2001) Spectrochimica Acta Part B: Atomic Spectroscopy, 56(6), 685-693 doi:10.1016/s0584-8547(01)00182-3.

* cited by examiner

METHOD AND APPARATUS FOR QUANTITATIVE CHEMICAL ANALYSIS OF LIQUID METALS AND ALLOYS

RELATED APPLICATIONS

The present application is a U.S. National Stage application under 35 USC 371 of PCT Application Serial No. PCT/EP2021/084060, filed on 2 Dec. 2021; which claims priority from EP Patent Application No. 20211367.6, filed 2 Dec. 2020, the entirety of both of which are incorporated herein by reference.

FIELD OF INVENTION

The invention is within the field of spectroscopic analysis and specifically relates to a Laser Induced Breakdown Spectroscopy (LIBS) method and apparatus for analysing liquid metals and alloys using a non-immersive instrument for high-precision analysis.

TECHNICAL BACKGROUND

Direct chemical analysis of molten metal is of critical interest in production, casting and recycling of metals and alloys. With present-day technology, analysis of a few specific impurities can be performed in the bulk liquid metal using solid-state electrochemical probes while a more comprehensive chemical analysis of alloying or trace elements can be obtained using spectroscopic measurements performed at a surface of the molten metal. One such technique is Laser-Induced Breakdown Spectroscopy, LIBS, which is frequently proposed as being suitable for analysis of liquid metal. LIBS is an atomic emission spectroscopy technique where a laser pulse is used to excite a sample, creating a plasma composed of matter in an excited energy state and where emitted light is detected from the plasma during its subsequent relaxation, which includes spectrally narrow emission lines characteristic of the elements in the sample.

Laser excitation of a small volume of material followed by spectroscopic analysis of atomic optical emission provides a fast and versatile method for elemental analysis of samples in the solid, liquid or gas phase. It is generally held that such a technique requires little or no sample preparation. Nevertheless, in terms of quantitative analysis, LIBS has to date had limited success in industrial analysis and has generally been considered inferior to other elemental analytical techniques such as Spark Optical Emission Spectroscopy (Spark OES or Arc-spark OES), inductively coupled plasma-atomic emission spectroscopy (ICP-AES) and inductively coupled plasma mass spectrometry (ICP-MS). The first-mentioned technique is applied in particular to the surface of solid electrically conducting samples that, in some cases, have been milled to a specific depth to obtain the best possible correspondence between the surface analysis and the actual chemical composition of the original melt. When analysing metals, the other two methods typically involve a volume of a solid sample to be chemically dissolved and subsequently introduced to an inductively coupled plasma.

Various approaches to determine the chemical composition of a liquid material with LIBS have been proposed in the prior art. EP184590 discloses a method and apparatus for analysing a fluidised body by using a high output pulsed laser and measuring the emission spectrum from the irradiated surface of the fluidised body, where the surface may be moving in the vertical direction. The problem of the surface not being still is addressed by using a focusing lens with sufficiently long focal length such that the relationship $0.95 \leq L \leq 1.05$ will apply, where L represents the varying distance between the lens and the surface being measured. In other words, the surface is maintained within the so-called Rayleigh range of the focused laser beam that defines the focusing depth in the propagation direction. In the examples provided in EP184590, a lens of focal length 170 cm is used and the document states that using lenses with focal lengths 100-200 cm will make it possible to tolerate vertical movement ranging from 10 to 20 cm of the surface of the substance to be measured. For the same reason, a concave mirror with a focal length similar to that of the laser focusing optics is used for light collection. Analytical result are disclosed for a non-specified sample, analysing content of elements (Si, Mn, Cr, and Ni) that are in a concentration range of 0.018% to 0.40%, showing relative deviation from "conventional method" of 8%, 11% 10% and 12%.

Aragon et al. (Applied Spectroscopy, 53(10), 1999, 1259-1267) discloses analysis of carbon content in solid steel samples using LIBS, but mentions that also liquid and gaseous samples can be analysed with the technique. The reported precision is 10% for carbon content in the range 150-1100 ppm and the detection limit is 250 ppm. The influence of affecting the LIBS signal by varying the position of the focus spot of the excitation laser relative to the sampling point is discussed. In this paper, the conclusion is that in order to optimize the intensity of the LIBS signal, the beam focus should be placed slightly below the sample surface, but still within the Rayleigh range.

Rai et al. (Review of Scientific Instruments, 73(10), 2002, 3589-3599) discloses a fiber optic LIBS sensor for measuring on-line in situ elemental composition of a molten alloy inside the melt in a furnace. The sensor is based on the transmission of laser energy through a multimode optical fiber. The laser radiation from the fiber is collimated and finally focused inside the aluminium melt in the furnace by a specially designed stainless steel holder that the holds the collimating and focusing lens. Atomic emission is collected by the same stainless steel holder. The setup aims at keeping the melt surface at the focal point of the focusing lens.

WO 2007/012440 discloses a LIBS based method for analysing liquid metal using a probe provided with a ceramic tube which protects the probe from liquid metal. Gas pressure is applied inside the tube by a stream of gas which is supplied via an inlet port of the probe and the gas is also used to remove impurities at the surface of the bath by purging with a stream of purge gas. A submerged pipe system is used, extended into the bath of liquid metal, which causes a convex meniscus of the molten metal inside the casing of the submerged pipe.

Presently, precision elemental analysis in metal production industry, such as in aluminium plants, steel smelters and the like, typically involves taking samples of liquid metal at different stages of the production process, solidifying the metal and analysing the solid samples using laboratory equipment. It would, however, be highly advantageous to analyse the elemental composition of liquid metals in-situ with high-precision quantification that accurately represents the true chemical composition of the molten metal. To date, however, prior art describing spectroscopic measurements carried out at a liquid metal surface, including those involving LIBS analysis, has not demonstrated sufficiently high levels of measurement accuracy to compete with the above-mentioned laboratory techniques.

SUMMARY

The present invention is specified in the claims as well as in the below description. The invention describes an apparatus and methods by means of which quantitative measurements of one or more elements in a liquid metal or alloy sample can be obtained using a surface-measurement with a small sampling volume, such as in particular LIBS. The features of the invention ensure that the measurement result provides a value of the concentration of trace impurities or alloying elements that is representative of their bulk concentration in the sample. The method is particularly useful for process control and/or quality control within the metallurgy industry such as but not limited to aluminium plants, steel plants, silicon and ferrosilicon plants, and essentially any other industry where accurate quantitative analysis of liquid metal or alloy is desired, without having to cast a solid metal sample for laboratory analysis.

The invention provides a modified method and apparatus ensuring proper measurement conditions by which quantitative analysis of elements performed at the molten metal surface becomes representative of the bulk concentration. This provides measurement results having significantly greater accuracy than has been achieved in liquid metal analysis using methods and apparatus described by the prior art. The application of the present invention has been shown to provide correlations (Pearson r) between surface analysis of trace elements in liquid metal with bulk analysis of corresponding solid samples exceeding 0.9999, low limits of detection (LOD) and high measurement repeatability. The features and detailed embodiments described herein below refer generally to both the method and apparatus of the invention.

The method of the present invention is based on a combination of novel features modifying prior methods applying LIBS technology, which combination greatly enhances the precision and trueness (collectively termed 'accuracy') previously achieved and reported for LIBS-based methods.

A primary aspect of the invention provides a method of measuring one or more elements in a liquid metal or alloy sample with Laser Induced Breakdown Spectroscopy, comprising:
  providing a sample of the liquid metal or alloy to be analysed and placing an instrument head above the sample surface, which instrument head comprises: laser excitation optics arranged to receive and focus transmitted light from a pulsed excitation laser, receiving optics for receiving emission from the sample, an open-bottom chamber through which the laser excitation optics direct laser light, the open-bottom chamber extending upwardly from a substantially flat bottom surface of the instrument head,
  positioning said instrument head at a distance from the sample surface such that the laser excitation optics focus pulses from the excitation laser to a focal point which is at a distance below the sample surface which is larger than the Rayleigh length of the laser pulses, effectively placing the surface of the sample outside of the proper focus of the excitation laser beam,
  emitting one or more laser pulses on the sample through the excitation optics with sufficient optical energy to ablate a fraction of the sample volume and create a plasma above the liquid metal surface,
  receiving emitted light through the receiving optics from the generated plasma and transmitting to a detector for recording spectral data for the detected light, and
  analysing the spectral data to obtain quantitative determination of one or more elements.

Another aspect provides an apparatus for measuring one or more elements in a liquid metal or alloy sample with LIBS, such as in particular for carrying out the method of the invention, the apparatus comprising
  a pulsed excitation laser,
  an instrument head comprising:
    a laser path channel,
    laser excitation optics arranged in said laser path channel,
    receiving optics for receiving emission from a plasma created at a sample surface,
    an open-bottom chamber extending upwardly from a substantially flat bottom surface of the instrument head, the laser path channel extending to said chamber,
    at least one gas channel for feeding gas through at least said laser path channel to the open-bottom chamber,
  wherein the pulsed excitation laser and laser excitation optics are configured such that when the instrument head is at a distance from a sample surface in the range of 1-10 mm, the focal point of the pulsed excitation laser is beneath the sample surface at a depth which is exceeds the Rayleigh length, $z_R$, of the focused laser. In other words, the distance, d, from the laser excitation optics to the sample surface is less than the focal length of the excitation optics designated as f by more than the Rayleigh length, $d<(f-z_R)$, but typically more than half the focal length, $d>(f/2)$. This feature of the apparatus serves in particular the purpose of stabilizing the plasma generation and preventing detrimental interactions from taking place before the laser pulse reaches the sample surface, between the focused laser light and the ambient atmosphere that typically occur close to or within the Rayleigh range ($\pm z_R$) of the focused beam. The Rayleigh length for a chosen laser and excitation optics can be calculated from well-known physical equations and/or measured by measuring the cross-sectional profile of the pulsed laser beam along the beam path. Generally, the Rayleigh length and therefore the distance between the sample surface to the proper beam focus specified by the invention is dependent on both the properties of the excitation optics and the laser beam.

The influence of affecting the LIBS signal by varying the position of the focus spot of the excitation laser relative to the sampling point has been discussed in the prior art, including, for example, Aragon et al. (mentioned above) In that paper, the conclusion was that in order to optimize the intensity of the LIBS signal, the beam focus should be placed slightly below the sample surface, but still within the Rayleigh range. The same general conclusion can be widely observed in the prior art, i.e., that the excitation beam focus should coincide closely with the sample surface. The necessity to maximize the overall LIBS signal in this fashion is, in some cases, imposed by inefficient detection of the emitted radiation, for example, when the detection optics is placed far away from the plasma excitation spot.

Conversely, according to the present invention, it is advantageous that the detection optics is separate from the excitation optics and placed close to the sampling point to counter the effect of reduced signal and to realize the advantages of increased measurement stability offered by placing the beam focus further below the sample surface. This can be especially important when measuring liquid metals at high temperatures.

The prior art describes measurement probes, where the excitation laser is positioned separately from the probe and connected to it using a multimode optical fibre. This requires the pulsed laser light to be coupled into the fibre without ablating the input end of the fibre, such as in the probe described by Rai et al. (mentioned above), where the fibre facet is for this reason intentionally positioned outside the focusing range of the coupling lens. Consequently, this also limits the energy that can be physically coupled into the fibre and transmitted to the probe. In addition, multimode interference will cause a degradation in beam quality, requiring a strong focusing of the excitation beam within the probe to cross the threshold for ablation at the sample surface. The low pulse energy, mode interference and strong focusing will all contribute to the instability of the fibre-coupled probe method, irrespective of whether the probe is immersive or non-immersive.

The method of the invention can be applied to a variety of metals and metal alloys such as but not limited to aluminium, aluminium alloys, steel, steel alloys, iron, iron alloys, copper, zinc, lead and other metals and metal alloys in their liquid state and is highly useful in industrial settings and applications as mentioned above.

The method and apparatus of the invention are not limited to analysis of any particular elements and can be used both to determine concentration of the main components in the metal or alloy sample, or trace components, including dissolved gases. Accordingly, in some embodiments the method and/or apparatus is for determining in the liquid metal or alloy sample the true bulk concentration of one or more elements selected from Aluminium, Silicon, Phosphorus, Sulphur, Chloride, Calcium, Magnesium, Sodium, Titanium, Vanadium, Chromium, Manganese, Iron, Cobalt, Nickel, Copper, Zinc, Zirconium, Niobium, Molybdenum, Ruthenium, Rhodium, Palladium, Silver, Cadmium, Tin, Antimony, Wolfram, Rhenium, Iridium, Platinum, Gold, Mercury, Lead and Bismuth. The method is also suitable for quantifying very light impurity elements such as Hydrogen, Lithium, Beryllium, Boron and Carbon that are difficult to detect with certain other analysis methods.

The measurement apparatus comprises suitable means of excitation and detection for generating and receiving atomic emission from the sample. This includes but is not limited to all variations of plasma excitation methodology known in the art, including but not limited to the use of conventional LIBS methods, LIBS with dual collinear or non-collinear pulses, combined LIBS/electrical discharge methods, or the like.

In a preferred embodiment, the spectral analysis is based on a LIBS method where one or more laser pulses in sequence are directed to the sample surface through excitation optics, and light emitted from the sample is received through receiving optics and transmitted to a detector for recording spectral information of the detected light. The optimum optical detection methods and subsequent processing of detected emission are as such known to the person skilled in the art. From the spectral information one or more emission peaks are then analysed and typically compared to calibration values in order to obtain quantitative determination of one or more elements. Preferably, the apparatus comprises a computer that receives and processes the spectral data from the detector. The computer is advantageously programmed to process the data, including normalising spectra, assigning relevant peaks, calculating signal strength, and calibrating compared to reference values.

In any given embodiment, excitation optics and receiving optics may be fully separate or partly comprising the same optical elements. An important feature of the invention is that the excitation means and receiving optics are accurately positioned at a pre-determined distance from the sample surface for each individual excitation event while preferably also maintaining a substantially constant sample temperature as well as preferably simultaneously maintaining sufficient internal motion of the liquid metal to ensure homogeneity of the sample, such that the portion of the sample that is ablated into a plasma is representative of the entire volume of sample.

A pulsed excitation laser used in preferred embodiments is generally of conventional type as is used in present day LIBS configurations. Accordingly, the laser has in typical embodiments a wavelength in the range from about 200 nm to about 3000 nm. According to the invention, stable excitation conditions are ensured and the optical excitation configured such that a sufficiently large and reproducible volume of the liquid metal sample is ablated during excitation and such that the chemical composition of this ablated fraction of the sample is representative of the composition of the whole sample. In addition to other aspects of the invention, this requires the energy of individual pulses to be in the range 10-500 mJ for laser pulses having durations of 1-20 ns. Generally, the energy of the laser pulse must be chosen such that the laser fluence at the sample surface exceeds the threshold for ablation, where the exact value of the pulse energy will depend on a number of factors including the excitation wavelength, the pulse duration, the distance from the excitation optics, and the material to be ablated.

The instrument head can be suitably configured so that a laser excitation channel extends, typically vertically, from the pulsed excitation laser to the open-bottom chamber. An emission receiving channel can extend from the open-bottom chamber to the laser receiving optics. It is found useful to arrange the emission receiving channel at an angle such as e.g. about 45° from vertical (and parallel to the optical axis of the emission receiving optics). In some embodiments inert gas flow is directed through gas channels to openings located both in the laser excitation channel and emission receiving channel. Thus, the receiving optics may comprise a lens positioned so as to receive a light cone centred at an angle in the range of about 30-75° with respect to the sample surface, such as at a range from about 30°, or from about 35° or from about 40° or from about 45°, to about 75° or to about 70° or to about 65° or to about 60° or to about 55° or to about 50°.

The receiving optics are preferably suitable configured so that when the instrument head is correctly positioned, the receiving optics are positioned at a suitable distance from the sample surface, such as in the range from about 5 mm to about 100 mm, such as in the range from about 5 mm, or from about 10 mm or from about 15 mm or from 20 mm or from about 25 mm or from about 30 mm, to about 100 mm, or to about 90 mm or to about 80 mm or to about 75 mm or to about 60 mm or to about 50 mm or to about 40 mm.

In some embodiments the receiving optics comprise more than one lens, the lenses are preferably arranged radially around the point of contact of the laser pulse and sample surface. Thus, the receiving optics can comprise a plurality of lenses arranged at the same or different angles with respect to the sample surface. Light collected by the one or more receiving optics can be transferred via fibre optics or other optical transmission means to the same spectrometer or to different spectrometers (for example, each lens in a plurality of lenses can transfer light to its respective spectrometer). In some embodiments such plurality of spectrometers is configured so that each spectrometer collects emission at a limited wavelength range, so that the plurality of spectrometers together covers the entire desired wavelength range. In some embodiments, spectroscopic detection may also comprise detection of selected wavelength bands using one or more suitable bandpass filters and optical sensors.

The instrument head comprises a bottom surface that faces the sample surface during measurement, which surface comprises an open-bottom chamber as mentioned above which is a chamber for accommodating the part of the sample to be detected, typically in the form of a plasma plume, providing confinement and stable environmental conditions surrounding the sampling point.

In some embodiments a stream of preferably inert gas is fed from a source through one or more gas channels to the open-bottom chamber to maintain an inert atmosphere and preferably a slight overpressure within said chamber and preferably a substantially laminar flow of the gas from the open-bottom chamber and between the sample surface and bottom surface of the instrument head in vicinity of the open-bottom chamber. This means that in the area of the plasma and its immediate vicinity, there is a constant and substantially laminar flow of gas, such as argon, helium or nitrogen. Accordingly, the gas channels are preferably sized and shape to maintain laminar gas flow through them, e.g. such that the flow rate and the gas channels are configured to have a Reynolds number of about 2300 or less.

Preferably the one or more gas channels have an opening in the chamber to deliver a stream of preferably inert gas from a gas source. This maintains a slight overpressure within the chamber and gas channels relative to the surrounding atmosphere, ensuring a substantially continuous, consistent and non-reactive gaseous environment above the sampling point, protecting the optical path of the excitation light and the optical path to the detection optics (which may be a common channel) from dust, smoke as well as gas, particles, splashes and the like from laser pulses impinging on the sample surface. The bottom surface of the instrument head must withstand heat from the adjacent sample surface and preferably comprises a ceramic or other heat-sustaining material with low thermal conductivity. Cooling means can be applied, such as but not limited to channels for a cooling liquid or cooling gas, within the instrument head and in particular close to the bottom.

The open-bottom chamber is not limited to a certain geometry, but can in some embodiments have a general cylindrical shape, e.g. with a diameter in the range of 10-20 mm, or a horizontal cross-sectional area in the range of 1 to 3 $cm^2$. The chamber can also have but is not limited to a square, hexagonal, octagonal, or other cross-sectional shape. The height of the chamber is such as to accommodate the plasma created by the laser. In some embodiments the height of the chamber is in the range of 5-15 mm such as in the range of 5 to 12 or 5 to 10 mm, e.g. 5, 6, 8 or 10 mm.

The open bottom (entrance) of the chamber can have the same cross-section as the walls of the chamber or the bottom (hole of the chamber) can have a smaller cross-sectional area than the main chamber itself. Thus in one embodiment the chamber has a cross-section with a diameter of 10-15 mm, such as e.g. 10, 12 mm 15 mm, a bottom layer of the instrument head has a concentric hole with a diameter that is 2-4 mm smaller, e.g. a diameter smaller by 2, 3 or 4 mm. The thickness of this bottom layer can be e.g. in the range of 1-10 mm, such as in the range of 1-6 mm or the range of 1-4 mm thick, such as about 1, 1.5, 2, 2.5, 3, or 4 mm.

In some embodiments the bottom surface of the instrument head comprises a heat resistant layer which is preferably a thermally insulating layer such as e.g. a high-temperature resistant ceramic layer. The bottom portion of the bottom surface has a hole concentric with the open-bottom chamber, where the hole has the same size and shape as the cross-section of the chamber or a smaller or larger size and can be configured as the above described optional narrow bottom hole of the open-bottom chamber. The hole in such heat resistant layer can thus be configured such that a part thereof defines an entrance that is narrower than the main chamber itself. The entrance opening can have the same thickness as the heat resistant layer or smaller thickness, such that the layer can have e.g. a thickness in the range of 4-12 mm, whereas the entrance opening to the chamber can have e.g. a thickness in the range of 1-6 mm such as 1, 2, 3, 4 or 5 mm, and above the entrance opening the heat resistant layer would form part of the main chamber in this embodiment.

Sample handling can advantageously be done, for example but not limited to, using a robot arm adjacent to the source of the liquid metal or alloy to be analysed, the robot arm holding a crucible or other liquid containment to obtain a portion of material such as by scooping up a suitable quantity of sample. The crucible held by the robot arm can be a crucible which can then be used as the sample crucible, or the robot arm can in another embodiment be used to pour the obtained sample into another designated sample crucible. The sample of liquid metal can also be introduced manually to the sample crucible, e.g. by means of a human operator using a sampling ladle for extracting metal from a reduction cell, mixing furnace, holding furnace, or the like, where the sampling ladle can, in some embodiments, also be used as the sample crucible holding the sample during measurement.

In some embodiments, the sample crucible is advantageously brought into a vicinity of a means of electromagnetic induction, which simultaneously provides a heating and stirring effect. In such embodiments, an important feature of the present invention is that the coupling between the sample and the means of heating and stirring is configured and controlled in such a way as to minimize surface movement, while maintaining a desired temperature and ensuring homogenization of the liquid metal sample, during a period of time suitable for performing said elemental analysis. The period of time during which the measurement is performed is referred to herein as the measurement period. During the measurement period, the sample of liquid metal is maintained in proximity to the source of inductive field so as to ensure proper coupling between the two. In a preferred embodiment, the source comprises a substantially flat and circular inductive element positioned underneath the sample crucible.

For protection against e.g. spilling of liquid metal, the heating element can be suitably arranged within a tabletop or the like flat surface such as a ceramic surface or a surface from other suitable heat-resistant material, the minimum distance from the inductive heating element to the bulk metal solution during the measurement period can be e.g. in the range of 10-50 mm, depending on the exact configuration of the inductive element and its driving power.

In other embodiments, heating can be supplied with methods other than induction heating, such as conductive heating, advantageously configured in such a way as to provide a substantial degree of convective flow in the sample.

In some embodiments the sample crucible is arranged as a reservoir into which a sample can be fed via a connected duct or opening and fed from the reservoir via the same or another duct or opening. Such reservoir can for example be arranged on a dedicated sample loop into which molten metal can be directed, e.g. from a stream in a production facility or as conduit from a furnace or the like. Preferably, the ducts or openings can be closed with gate valves or the like, to stop the flow of metal through the reservoir during the analysis.

The term 'sample crucible' as used herein refers generally to any of the situations described above and similar cases, i.e. to any container that can withstand high temperatures and can hold liquid metal, and can refer to any size of sample crucible. Furthermore, the sample crucible is not specified to a particular shape or material, but its dimensions must be chosen as to allow accurate manipulation and positioning of the liquid metal sample with respect to the measurement apparatus. It is advantageous for the sample crucible to be resistant to heat shock and non-wetting for the particular liquid metal or alloy being analysed.

In a preferred embodiment of the invention, a LIBS measurement is performed on the surface of the sample, using a non-contact measurement apparatus positioned in relation to the sample container, either by moving the measurement instrument as a whole or by moving a movable part of the instrument, herein termed instrument head, or by moving the sample container, or both, such that the instrument head is positioned at a given distance above the surface of the liquid metal sample. The apparatus should be configured in such a way to allow substantially laminar flow of preferably inert gas around and over the measurement point, during the measurement period.

The sample crucible is substantially upwardly open, meaning that a sufficient portion of the surface of a sample in the crucible should be exposed to the excitation means and a portion of emitted light from the sample resulting from the excitation must reach the receiving optics. Depending on the size and shape of the sample container, the top end of the container may in some embodiments be fully open so that substantially the entire surface of a sample is exposed, in other embodiments the top is partially closed, such as but not limited to 30% closed or 40% closed, 50% closed or 60% closed or 75% closed, but such that the above criteria of necessary access to the sample surface are met.

It is a premise of the method that a consistent and substantially constant temperature of the liquid metal sample is ensured during analysis, said temperature being higher than the melting temperature of the metal or alloy. This involves in preferred embodiments that the sample container is actively heated, either continuously or periodically. In some embodiments, active heating is turned off immediately prior the sample analysis, i.e. before spectral emission from the sample plasma is being detected/recorded. In some embodiments of the present invention the sample is heated or maintained at a temperature above at least 400° C., such as above at least 600° C., such as above at least 700° C., such as above at least 800° C., above at least 1000° C. or above at least 1200° C. or higher, such as above about 1600° C. The desired optimal temperature of the sample during the analysis depends on, in particular, the melting point of the specific type of metal or alloy being analysed.

As a non-limiting example, pure aluminium has a melting point of 660° C., thus in the context of the present invention an optimal temperature of the sample may lie in the range from about 660° C. to about 960° C., such as in a range from about 680° C. or from about 700° C. to about 780° C. or to about 760° C. or to about 750° C. For other metals and alloys a higher temperature is needed to maintain a sample in molten state, for example, steel has a melting point in the range 1370-1540° C. depending on type and grade, accordingly in some non-limiting embodiments of the present invention the sample is heated to a temperature within or above said range such as above about 1400° C. or above about 1500° C. or above about 1600° C. In a preferred embodiment, the temperature of the molten metal is monitored in the sample container itself using, for example, a sheathed thermocouple. The temperature of the liquid metal can also be monitored indirectly or by using non-contact optical thermometry.

The sample container can have a different size in order to accommodate a sample of suitable volume depending on the configuration of the heating means, method used to obtain the sample, etc. In some embodiments the volume of the sample that is placed in the sample container is in the range from about 50 mL or from about 100 mL to about 1000 mL or to about 500 mL, or to about 300 mL or to about 250 mL or to about 200 mL, or to about 100 mL, such as in the range 50 to 500 mL or in the range 100 to 300 mL, such as about 100 mL, about 150 mL or about 200 mL. While the actual volume of liquid metal being subject to spectroscopic analysis is comparatively very small (i.e. the actual volume/area being irradiated and which emits emission to be detected), the larger overall sample volume is critical to maintain a stable sample temperature and, for embodiments that involve inductive heating, to ensure optimal interaction with the heating and stirring means while simultaneously minimizing surface instability due to internal movement and deformation of the sample by volume forces generated by the inductive field. The sample container is preferably sized in accordance with the desired maximum amount of sample to be contained therein. Furthermore, the shape of the sample container can be appropriately chosen and configured in such a way as to block potentially harmful laser and plasma radiation escaping from the sampling point during measurement.

In certain embodiments the heating of the sample container is provided by placing the container in contact with the surface of an adjacent source of liquid metal or alloy, such as in a trough that the sample is being taken from. This means that the sample container is suitably configured to transmit such a heating effect and is arranged on a suitably configured moveable platform (e.g. extending moveable arm, hooks or the like) to bring the container towards the surface and/or maintain the container at desired contact with the surface for at least a period of time. In such embodiments it is advantageous that the heating means introduces temperature gradients in the sample sufficient to induce a degree of convective flow in the liquid metal sufficient to maintain a substantial chemical homogeneity of the sample.

It is an advantage of the method and apparatus of the invention that in preferred embodiments the trueness and precision in the chemical analysis are optimized. In order to ensure accuracy of analysis it is preferable that the steps including sample collection, sample conditioning, and analysis are performed in a substantially similar fashion for analysis of different samples, meaning that the same or substantially similar volume of liquid metal is collected and placed in the sample container, samples are held at the same or substantially similar temperature, with a substantially similar degree of internal movement induced during or immediately prior to measurement. Furthermore, the position of the sampling point and its immediate environment, i.e. the local atmosphere at and immediately above the sampling point, as well as along the path of the optical excitation, is kept substantially similar. Maintaining consistency also requires successive analyses to be performed at the same or essentially similar pre-determined distance between the excitation and detection means and the sample surface, both for repeated analysis on the same sample as well as between analyses of different samples. To achieve this, the abovementioned steps are preferably automated, as has been described herein for preferred embodiments of the invention.

In some embodiments the method of preparing the liquid metal sample for analysis additionally comprises a step of removing a top surface layer of the sample, in particular where the sample may have had to wait in between sampling and analysis, such that a crust or film has formed on the surface. In some embodiments this is done by skimming the surface with a mechanical scraper, preferably of a non-wetting material, such as in particular an automatic scraper that moves along the surface of the metal just prior to analysis or where the sample is moved with respect to a fixed scraper. The scraper can be furnished as a part of the instrument head, extending from the substantially flat bottom surface and into the liquid metal sample, such that a scraping function can be executed by horizontally moving the measurement head prior to performing the measurement. The scraper can also be arranged as a separate member. In some embodiments the scraping is performed by moving the sample crucible past the scraper. In some embodiments, removal of the surface layer can be achieved, solely or in addition to mechanical skimming, using the excitation means, such as a laser pulse impinging on the sample surface at the measurement point, prior to the actual analysis. Optical emission from such 'cleaning pulses' can also advantageously be monitored to determine the presence and chemical nature of surface contamination. The 'cleaning pulses' can be configured to have a pulse energy different from the plasma excitation pulses used for performing the LIBS measurement.

An important feature of the invention is to ensure a pre-determined distance between certain parts of the excitation means and/or receiving optics on one hand and the sample surface on the other hand. In the case of a liquid sample, however, this is only technologically feasible if the movement of the surface of the liquid can be simultaneously minimized. The present invention teaches that it is important to maintain internal movement, as well as a substantially constant sample temperature, during the analysis in order to ensure a representative measurement. It is an advantage of the inventive method that these conditions can be simultaneously met while ensuring that the sample surface can be maintained in fixed relation with the excitation and/or detection means throughout the measurement process with the distance varying less than ±100 µm and preferably less than ±50 µm and more preferably less than ±25 µm.

To further ensure the proper distance to the sample surface, the receiving optics should be accurately positioned for every measurement at a pre-determined distance from the sample surface. This is preferably done by having a distance sensor in the instrument head that is directed towards the sample surface through the opening on the sample container. Output from the distance sensor is transmitted to a control unit that controls movement by a movement mechanism of the instrument head, receiving optics and/or the sample container to adjust the distance to the desired value. In some embodiments accurate positioning of the instrument head is achieved by using a servo motor cooperating with suitable gear mechanism to move the instrument head or moveable internal unit thereof or moveable platform. An electromagnetic coil or other means of translational movement may also be used, including a stepper motor. The distance sensor and control unit can advantageously be configured to operate dynamically, such that during operation and processing and analysing a sample, the sensor is continuously operating and measuring the distance to the sample surface and based on the feedback from the sensor the control unit essentially continuously adjusts the distance as needed.

In one embodiment, the measurement head is furnished with one or more pins or similarly discrete structural features extending from the substantially flat bottom surface of the measurement head, touching or penetrating the surface of the liquid metal sample when the measurement head is located in its measurement position, with the purpose of reducing vertical wave motion on the surface of the liquid metal sample (that may exhibit high surface tension of, e.g., up to 1000 mN/m in the case of pure aluminium close to its melting point), said wave motion being related to, for example, induced movement of the liquid metal sample, shock waves propagating from laser pulses previously impinging on the sample surface, gas flow from the open bottom chamber, or external mechanical vibrations.

It is advantageous that the local environment/atmosphere at and immediately above the spot to be sampled, i.e. the spot on a liquid surface where the excitation of the sample takes place, is substantially consistent during repeated measurements. In the case of LIBS measurements, this can be achieved for example but not limited to ensuring consistent energy of laser pulses as they interact with the sample and in preferred embodiments ensuring that inert atmospheric conditions are maintained at and around the sampling point. Accordingly, in preferred embodiments a stream of gas, most commonly an inert gas such as Argon, is applied to the point of sampling, through an open-bottom space such as a chamber as is explained below. Within the frame of the present invention, it is important that any gas flow from the instrument head is substantially laminar and does not significantly perturb the surface of the liquid metal, such as not to disrupt the conditions ensured by the invention.

In summary, the apparatus of the invention comprises a means of configuring the measurement apparatus and influencing the liquid metal sample in such a way that a top surface layer may be removed from the metal sample prior to analysis, configuring the excitation optics such that the the sample surface is positioned more than one Rayleigh length in front of the proper beam focus, the sample surface is accurately positioned with respect to a substantially flat bottom part of the measurement head, and during analysis, to ensure that the temperature of the sample is substantially constant, surface movements of the liquid metal during analysis are minimized a substantially laminar gas flow is provided to maintain stable conditions in the optical beam paths and for development of the laser-induced plasma;

and, in some embodiments, to ensure that internal movement in the liquid metal is sufficiently maintained;

wherein also the sampling and handling of the metal is preferably automated for consistent and accurate positioning of the sample in relation to the means of heating and stirring the liquid metal as well as to the measurement device. The apparatus is in some embodiments built to be used in a fixed location, such as but not limited to the vicinity of an open trough, holding furnace, alloying furnace or melt treatment crucible in a metal production or processing plant. In other embodiments the apparatus is built to be easily transportable or portable, e.g. on a platform that can be moved from one sampling point to the other.

BRIEF DESCRIPTION OF FIGURES

The skilled person will understand that the drawings, described below, are for illustration purposes only. The drawings are not intended to limit the scope of the present teachings in any way.

DETAILED DESCRIPTION

The invention is described in further detail with reference to the accompanying drawings which are not to be construed as limiting the overall scope of the general concept of the invention. In the following, exemplary embodiments of the invention will be described, referring to the figures. These examples are provided to provide further understanding of the invention, without limiting its scope.

In the following description, several specific features are described which serve to exemplify embodiments of the invention, which is otherwise defined by the claims. Likewise, where series of steps are described, the skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
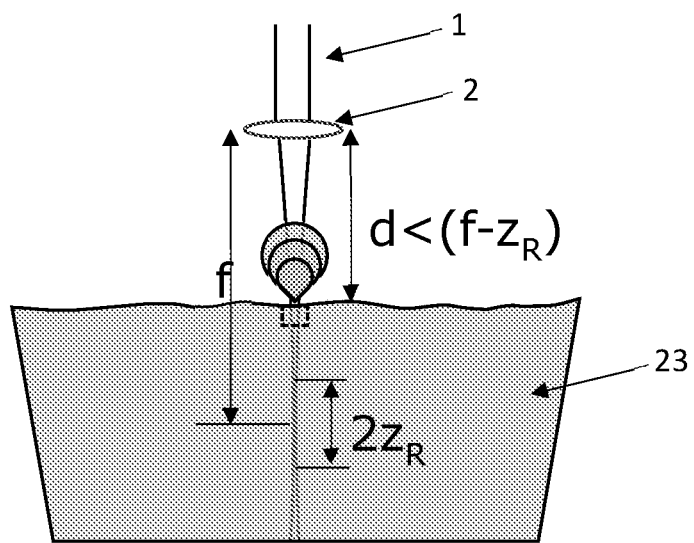
FIG. 1 illustrates the geometry of the optics and laser beam relative to the sample.

FIG. 1 illustrates the essential geometry of the present invention, showing the interaction between a pulsed laser beam 1, laser excitation optics that comprise a focusing element 2 defining a focal length f for the focused laser beam. The (virtual) focal point is shown positioned inside the sample 23, with the Rayleigh range extending one Rayleigh length $z_R$ in both directions from the focal point in the case of an ideal beam. Experimentally, the Rayleigh length is traditionally defined as the distance along the propagation direction of a beam from the beam waist to the position (on each side of the focal point) where the area of the cross-section of the beam is doubled as compared to its waist.

The laser pulses interact with the sample to ablate a fraction of the sample volume, the fraction depicted herein with a dashed line (not drawn to scale) to create a plasma plume 3 (not drawn to scale) above the liquid surface.

Figure 2:
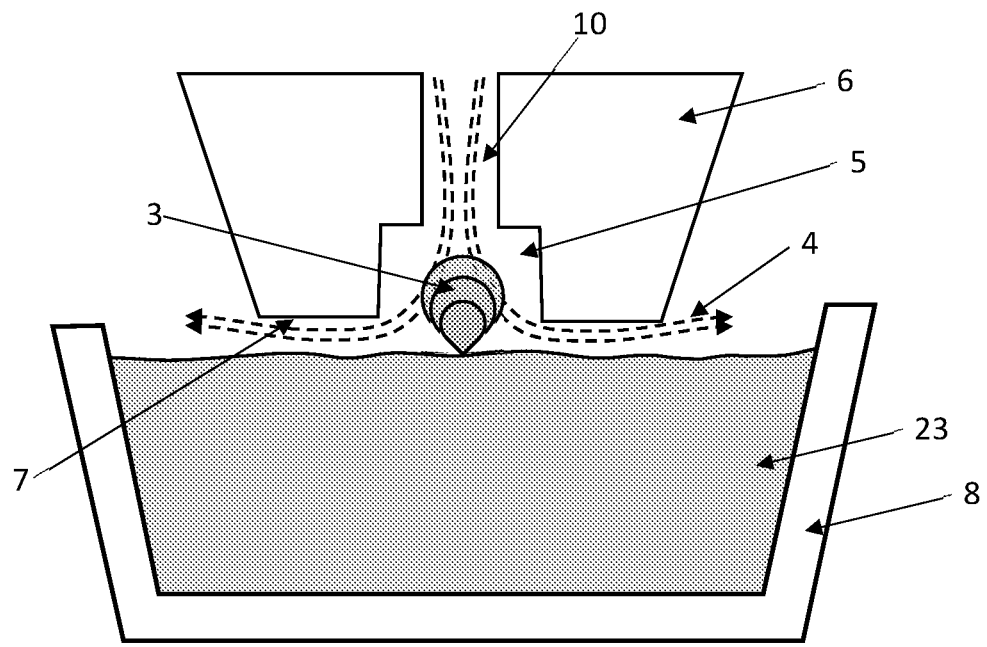
FIG. 2 illustrates how laminar gas flow is provided through the instrument head of the invention and between instrument head and the sample surface.

FIG. 2 illustrates schematically how a gas stream 4 (typically inert gas) flows through a laser beam path 10 and the open-bottom chamber 5 and past the bottom surface 7 of the instrument head 6 in the vicinity of the plasma plume 3 and chamber 5. The bottom surface is preferably maintained at a distance of about 2-3 mm from the surface of the sample 23 which is held in a crucible 8.

Figure 3:
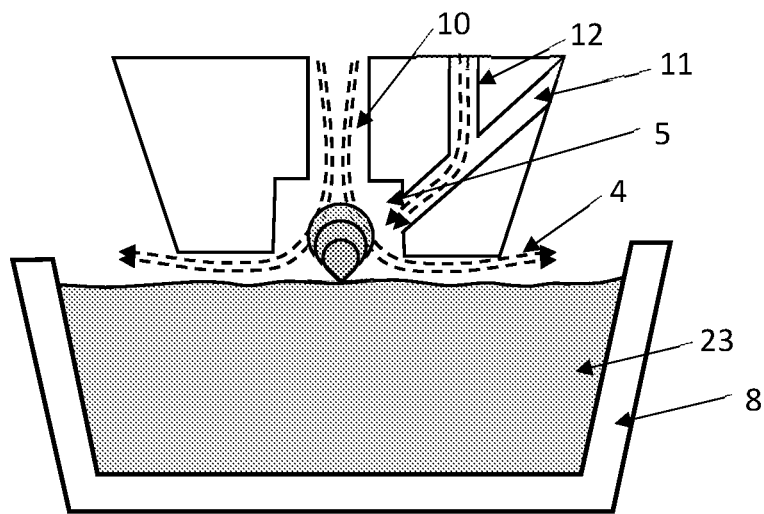
FIG. 3 shows an embodiment with gas flow arranged in the laser beam path and the path for emission detection.

FIG. 3 illustrates a possible configuration of a separate emission detection path 11 that leads toward detection optics (not shown), where preferably inert gas is also directed through a gas path 12 into the emission detection path 11 in addition to the laser emission path 10.

Figure 4:
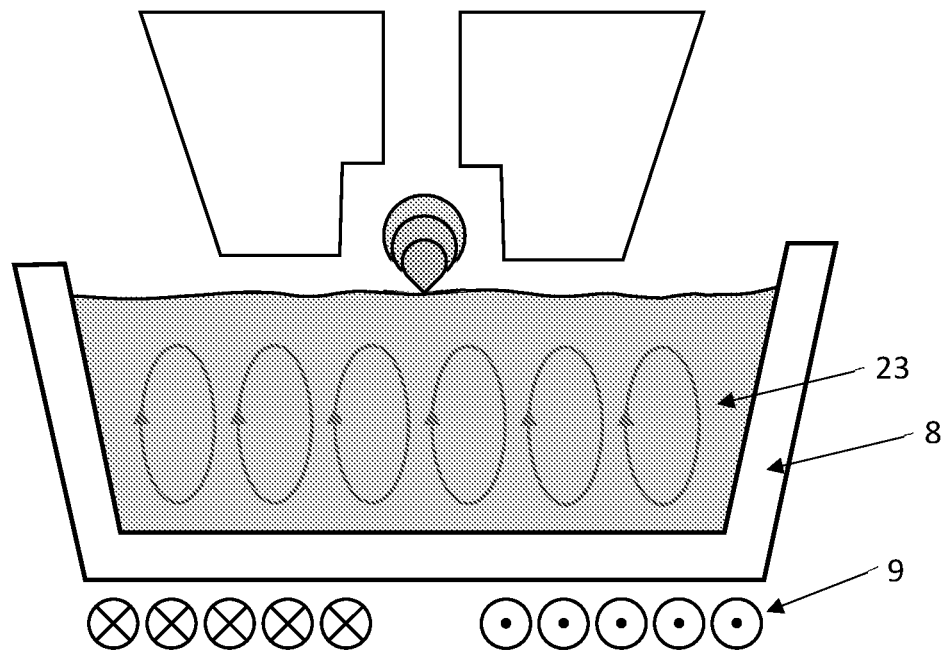
FIG. 4 shows an embodiment applying inductive heating to the sample to enhance sample homogeneity.

FIG. 4 illustrates an embodiment where an inductive heating element 9 is placed underneath a crucible 8 holding the sample. The inductive heating element is shown as the cross-section of a concentric coil that forms a substantially flat element. The inductive coupling with the sample 23 in the crucible creates a stirring effect in the sample, schematically shown, enhancing sample homogeneity. Placing the substantially flat element underneath the sample and tuning the inductive power and the distance between the sample and the flat element suitably ensures that the stirring effect does not cause too much vertical movement of the sample surface during measurement.

Figure 5:
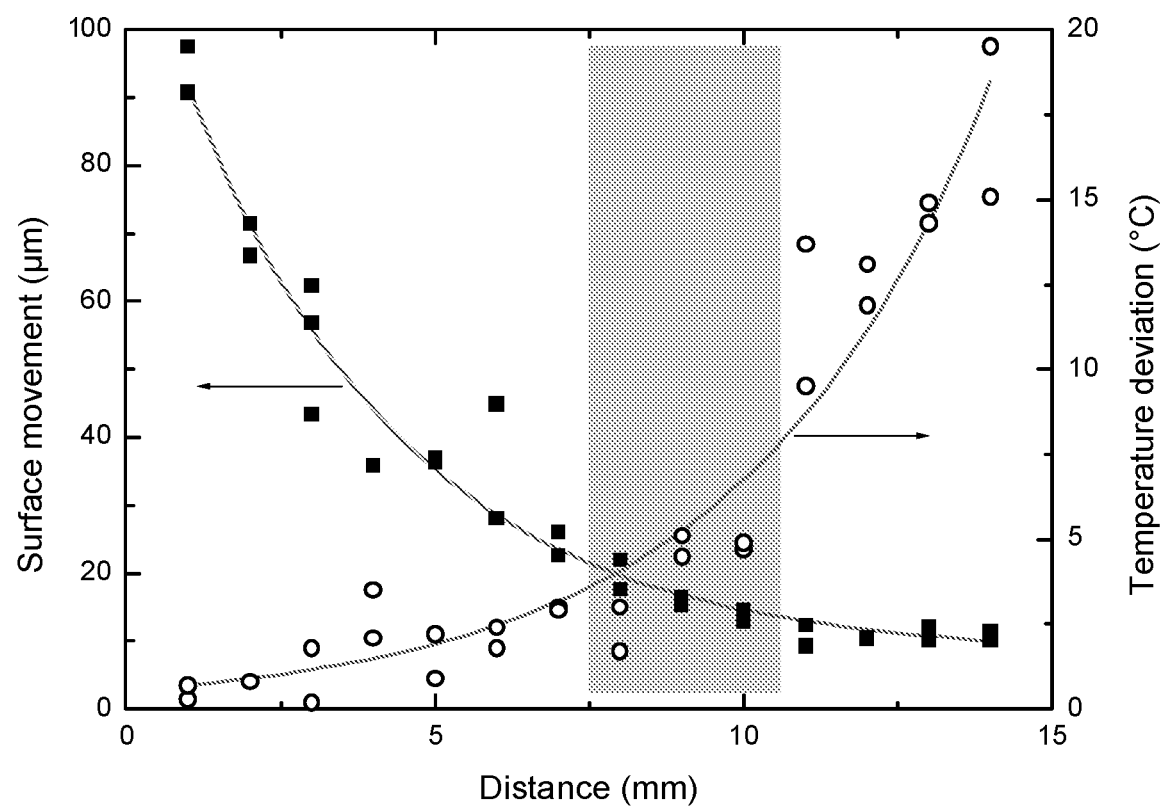
FIG. 5 shows measurement results that illustrate how surface instability is lowered by reducing the coupling to the means of induction heating.

FIG. 5 is graph illustrating the effect of heating a sample inductively and shows how surface instability is lowered by reducing the coupling to the means of induction heating. A LIBS apparatus was arranged with sample conditioning according to the invention, having a sample crucible heated with inductive heating with a flat inductive heating element arranged underneath the sample crucible, varying the distance between the crucible and the heating element for the purpose of illustration.

The graph shows results of measurements of surface instability and temperature drop as a function of the coupling between a sample of liquid aluminium and the inductive heating element. The inductive element is set to maintain a certain fixed temperature exceeding the melting temperature of the metal. Subsequently, the crucible holding the sample is moved a certain distance away from the element at the start of each spectroscopic measurement. The measurement interval during which the vertical surface movement (shown as its standard deviation from the average value) and temperature drop because of reduced coupling with the inductive field are recorded lasts 30 s. When the distance between the bottom of the sample crucible and the top of the inductive element is small (5 mm or less) the surface of the sample becomes more turbulent, with observed fluctuations of the surface of 40 μm and up to 90-100 μm for the closest measured distance (1 mm). Conversely, the temperature of the sample remains relatively stable, at 5 mm falling about 10° C. during the measurement period. As the distance is further increased, the vertical movement of the surface is reduced but the temperature drops more during the measurement period, close to 20° C. at the largest distance of 15 mm. The shaded area defines a suitable operating range for this particular heating element and crucible configuration where the invention ensures optimal measurement conditions where vertical surface movement and temperature drop are simultaneously minimized.

Figure 6:
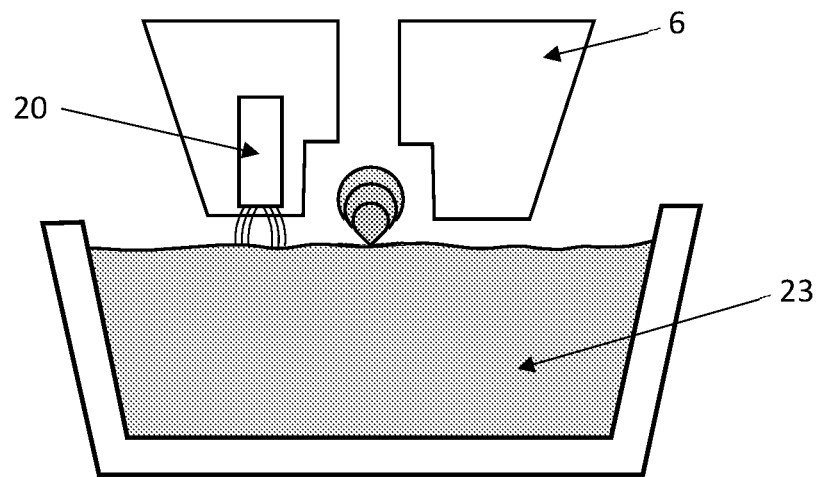
FIG. 6 illustrates an embodiment where a distance measurement sensor is arranged in the instrument head.

FIG. 6 illustrates an embodiment of the invention applying distance measurement to ensure accurate and precise distance between the emission on one hand and the excitation and receiving optics on the other hand. A distance measurement sensor 20 is arranged in the instrument head 6 that senses the distances between the instrument head and the sample surface. The distance sensor transmits signals to a control unit that adjusts the vertical position of the instrument head with movement actuators (not shown) to set or maintain an exact pre-determined distance to the sample surface.

Figure 7:
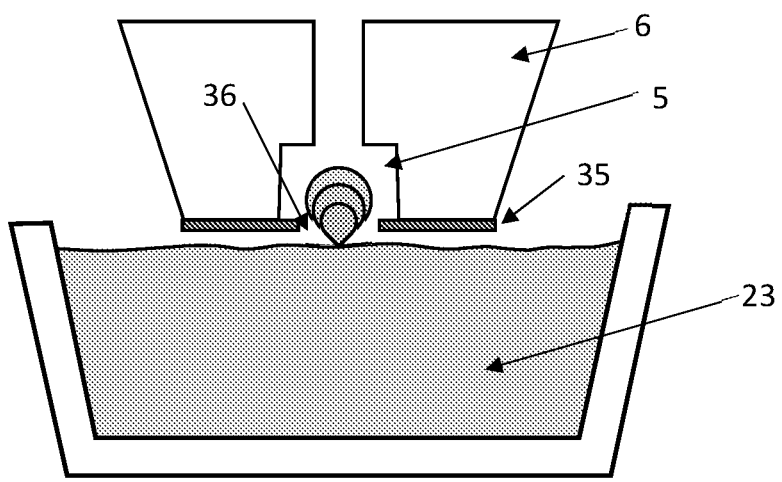
FIG. 7 illustrates how a heat resistant bottom plate is arranged on the bottom of the instrument head.

FIG. 7 shows in a simplified illustration how a heat-resistant bottom plate 35 is arranged on the bottom the instrument head 6. The plate forms an entry opening 36 to the open-bottom chamber 5, where, where the entry opening is concentric with the chamber but has a slightly smaller diameter/cross-section than the walls of the chamber.

Figure 8:
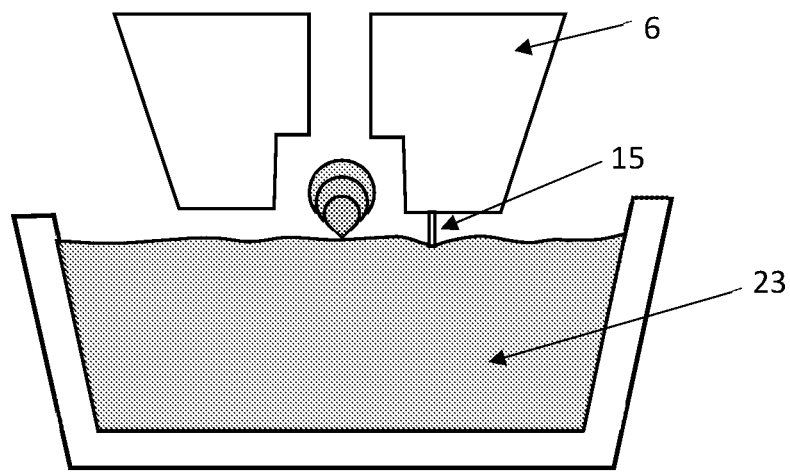
FIG. 8 shows an embodiment with a pin extending from the instrument head touching the sample surface, to reduce vertical wave motion of the sample surface.

FIG. 8 shows an optional feature of the invention, a pin 15 which extends from the instrument head bottom surface and which touches or penetrates the surface of the liquid metal when the instrument head is in measurement position. In actual embodiments, the number and shape of such features may be different. The purpose of the feature is to affect the vertical wave motion on the surface of the liquid metal sample. A similar feature can be used to perform the function of a scraper for removing an oxide or slag film from the surface immediately prior to measurement by touching or dipping into the liquid metal surface and utilizing a simultaneous horizontal movement of the measurement head and the sample crucible relative to each other.

Figure 9:
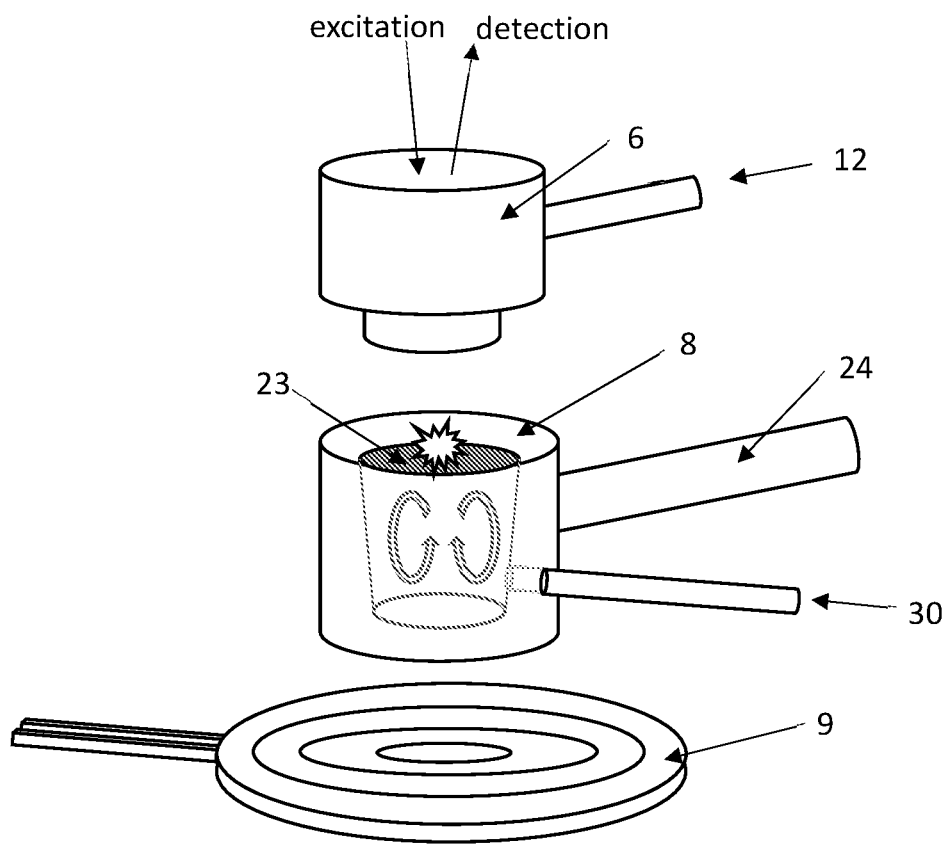
FIG. 9 shows a schematic overview of an embodiment of the invention with a flat inductive heating element placed under a sample crucible.

FIG. 9 shows schematically an example of a system in accordance with the invention where a sample crucible 8 is shown in the basic shape of a cylindrical ladle with a handle 24, containing a sample 23 of liquid metal. Underneath the crucible is shown a round and flat inductive heating element 9 at a certain distance from the crucible. An instrument head 6 is depicted above the sample crucible arranged with a feed line 12 for inert gas. The instrument head encloses optics for focusing and directing the laser beam to the sample surface and to receive and transmit emitted radiation from the created plasma at the sample surface. A thermocouple 30 measures the temperature in the sample.

Figure 10:
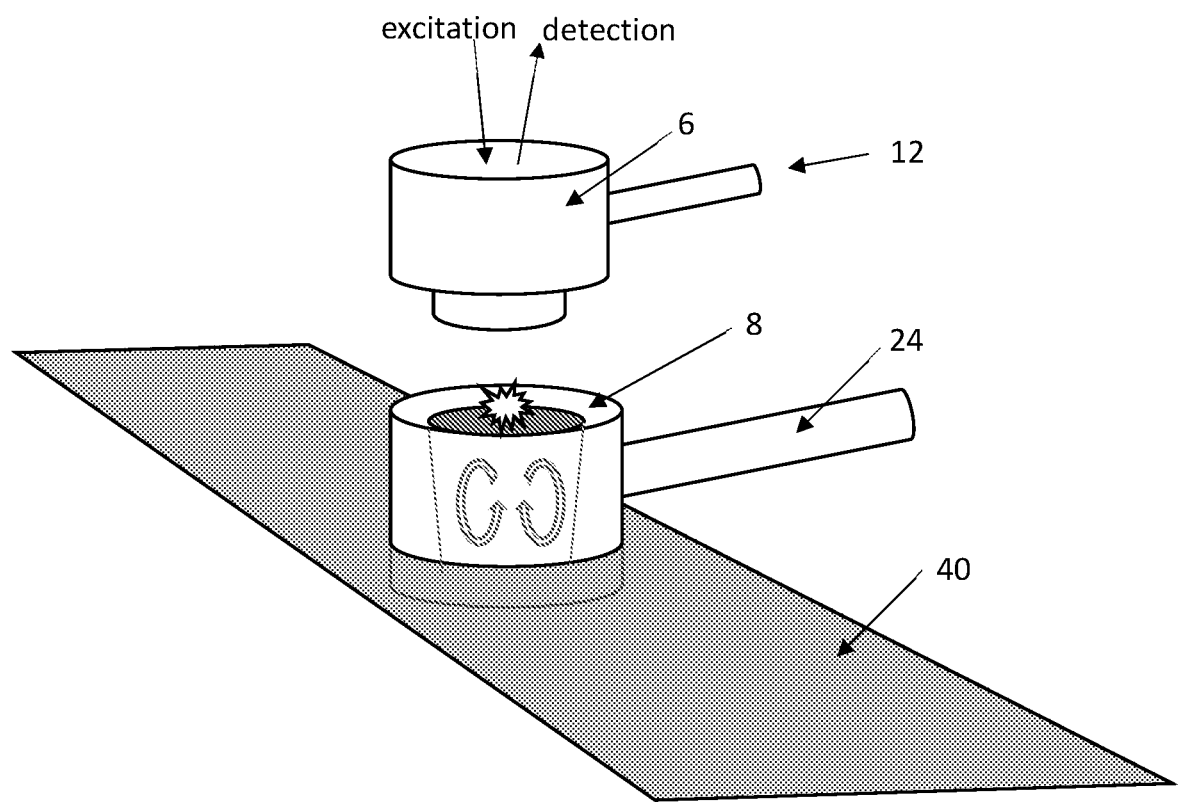
FIG. 10 shows an embodiment sample crucible is heated by placing in a stream of liquid metal.

FIG. 10 illustrates an embodiment where a sample crucible 8 is heated by placing in a stream of liquid metal 40. This can be done e.g. by attaching the sample ladle to a means of movement (not shown) adjacent to a trough of liquid metal for immersing the crucible into the stream for collecting and subsequently extracting a sample of liquid metal and keeping the crucible in a still position during measurement, where preferably the instrument head 6 is also arranged on a moveable arm or platform so that the head can be positioned suitably above the sample and then moved away from the trough.

Figure 11:
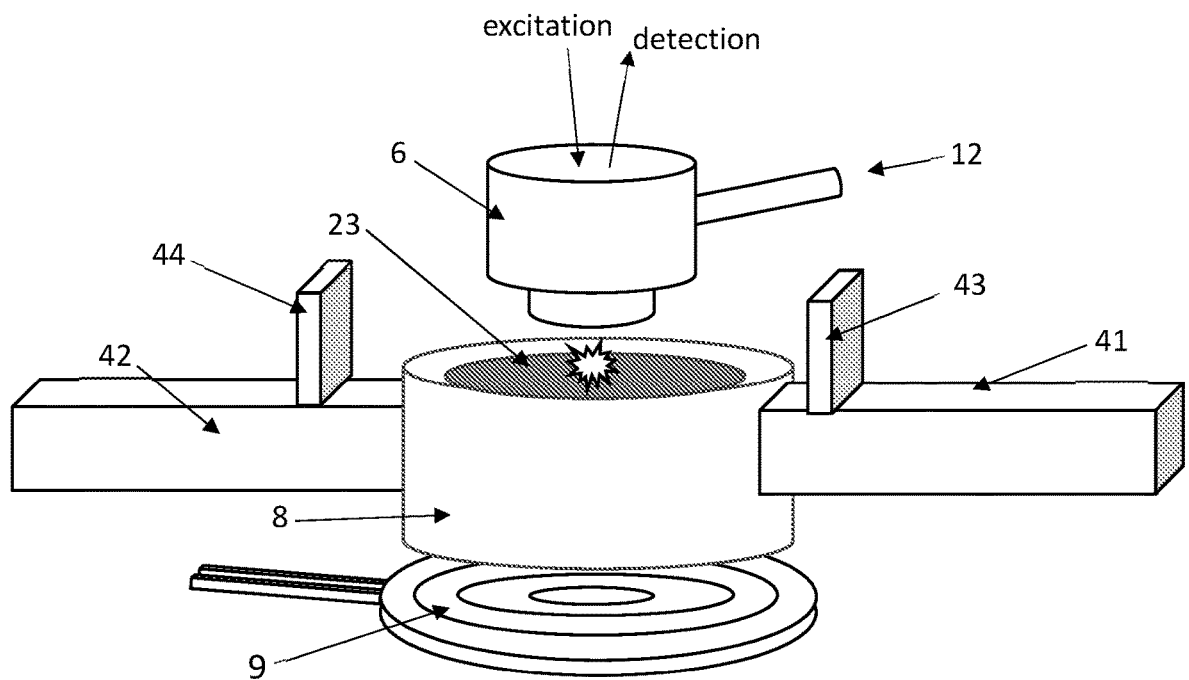
FIG. 11 shows an embodiment of the invention where the liquid metal sample is collected into a reservoir in a flow channel with entrance and exit valves

FIG. 11 depicts an alternative embodiment where a sample crucible 8 is configured as a reservoir into which a sample can be fed through a duct 41, 42. The duct can advantageously be arranged connected to a trough or a furnace holding liquid metal such as in a production facility.

The duct 42 is shown with two flaps 43, 44 one on each side of the reservoir, these represent gates in respective gate valves that can close off the duct on each side of the reservoir, to halt flow through the reservoir before and during measurement. Beneath the reservoir crucible is shown an inductive heating element 9.

Figure 12:
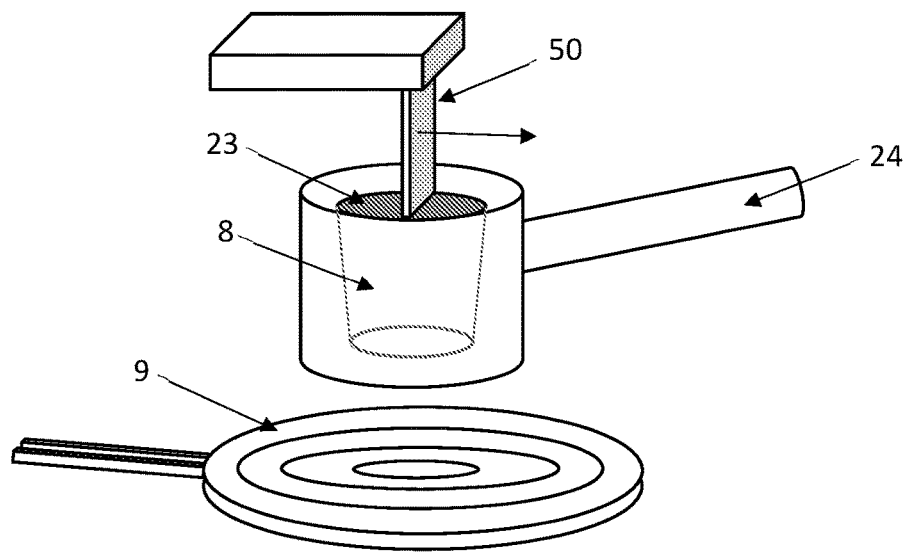
FIG. 12 illustrates the action of a mechanical scraper for removing a top surface layer prior to measurement.

FIG. 12 illustrates the principle of using a scraper 50 to skim the surface of the liquid metal sample 23 just prior to measurement, where the scraper is moved across the surface, or alternatively, the sample crucible is moved, such that there is movement of the scraper relative to the sample surface. The scraper can be mounted on the instrument head or be configured as a separate part.

Figure 13:
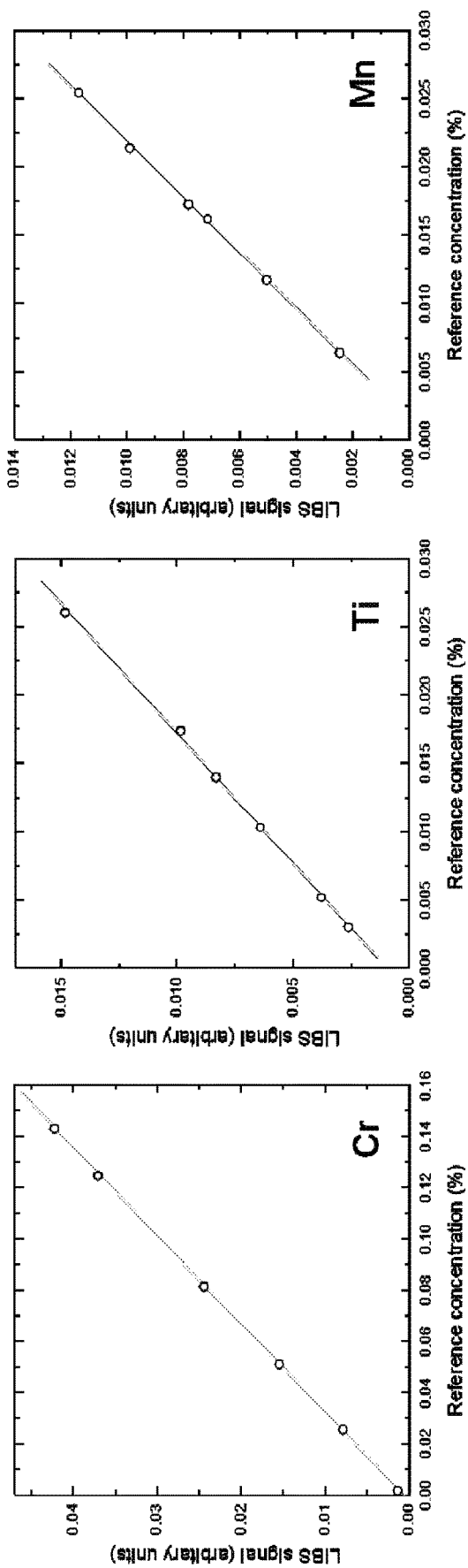
FIG. 13 shows correlations between concentration measurements, obtained with an OES system, calibrated with traceable standards, and a LIBS measurement implementing the features of the present invention.

FIG. 13 shows the correlation between LIBS measurements for three trace elements in liquid aluminium performed using the present invention and corresponding OES measurements on solid samples cast from the same melt samples. The correlation coefficient (Pearson r) in all cases exceeds 0.9995, suggesting that the correlation is limited only by the random measurement error in the LIBS and OES measurements that are of the order of 1% of the measured concentrations. The measurement standard deviation in both cases is approximately equal to or smaller than the size of the symbols in the figures.

Figure 14:
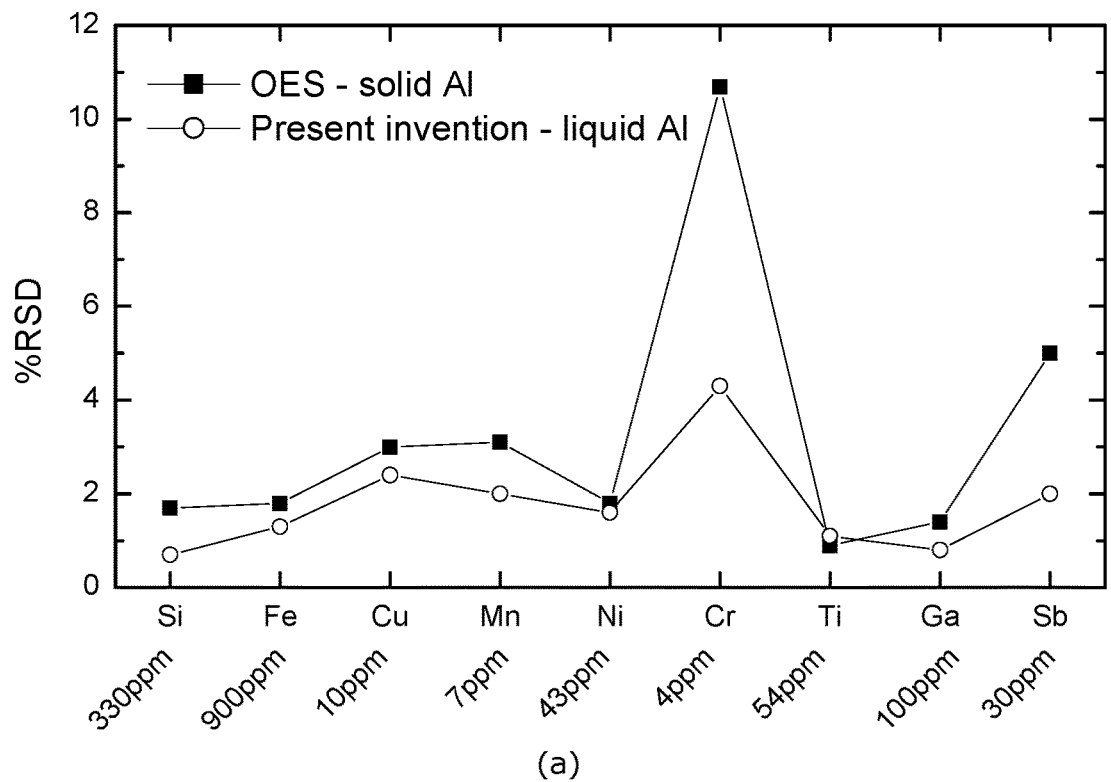
FIG. 14 shows a relative standard deviation (% RSD) of repeated measurements of several trace and alloying elements in liquid aluminium using the features of the invention, compared with the relative standard deviation of measurements in an OES system on solid aluminium sampled from the same melt.
Figure 14:
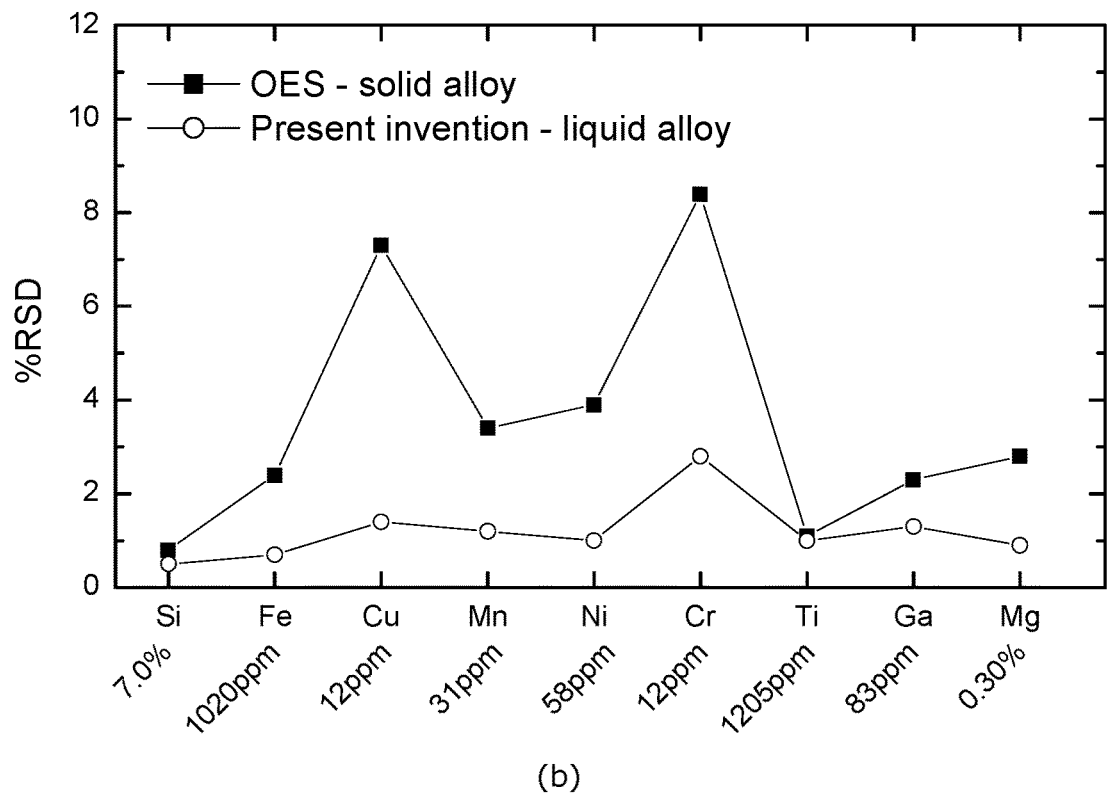

FIG. 14 shows the relative measurement standard deviation for ten elements (Silicon, Iron, Copper, Manganese, Nickel, Chromium, Titanium, Gallium, and Antimony or Magnesium) at the indicated concentrations measured in liquid aluminium (panel (a)) and AlSi7Mg0.3 aluminium alloy (panel (b)) using the present invention (open symbols). For comparison, the figures show the observed random error in OES measurements of corresponding solid samples (solid symbols) prepared from the same melt, following ASTM sampling and measurement standard E1251. For most elements, the random error of the measurements of the liquid metal is lower than that observed in the corresponding solid samples. The difference is more pronounced in the case of alloy where segregation during solidification is known to impact the homogeneity of the sample to a larger degree.

The invention claimed is:

1. A method of measuring one or more elements in a liquid metal or alloy sample with Laser Induced Breakdown Spectroscopy (LIBS), comprising:
   providing a sample of the liquid metal or alloy to be analysed,
   placing an instrument head above the sample surface wherein the instrument head comprises laser excitation optics that are arranged to receive and focus transmitted light from a pulsed excitation laser, receiving optics for receiving emission from the sample, an open-bottom chamber through which the laser excitation optics guide laser light, the open-bottom chamber extending upwardly from a substantially flat bottom surface of the instrument head,
   positioning said instrument head above the sample surface such that said laser excitation optics focus pulses from the excitation laser to a focal point which is at a distance below the sample surface which is more than one Rayleigh length of the focused laser beam,
   emitting one or more laser pulses on the sample through the excitation optics with sufficient optical energy to ablate a fraction of the sample volume and create a plasma above the liquid metal,
   receiving emitted light through the receiving optics from the generated plasma and transmitting to a detector for recording spectral data for the detected light, analysing the spectral data to obtain quantitative determination of one or more elements.

2. The method of claim 1, wherein the laser excitation optics are arranged in the instrument head such that when the laser focal point is suitably positioned the instrument head bottom surface is at a distance from the sample surface in the range of 1 to 10 mm and preferably in the range of 1-5 mm.

3. The method of claim 1, comprising feeding a stream of gas through the open-bottom chamber to maintain a substantially inert atmosphere within said chamber and a substantially laminar flow of the gas from the open-bottom chamber and between the sample surface and bottom surface of the instrument head in vicinity of the open-bottom chamber.

4. The method of claim 1, wherein a laser excitation channel extends from the pulsed excitation laser to the open-bottom chamber, and an emission receiving channel extends from the open-bottom chamber to the laser receiving optics.

5. The method of claim 3, wherein the stream of gas is fed through gas inlets in the laser excitation channel and emission receiving channel to create a gas flow though said channels and towards and through the open-bottom chamber.

6. The method of claim 1 comprising providing a heating source in the vicinity of the sample and heating the sample with said heating source for a period of time which includes at least a period prior to analysing and preferably heat is applied during said measurement period.

7. The method of claim 6, wherein said heating source comprises a substantially flat inductive heating element positioned underneath a sample crucible.

8. The method of claim 1 wherein a step of skimming the surface of the sample is applied prior to measuring.

9. An apparatus for measuring one or more elements in a liquid metal or alloy sample with Laser Induced Breakdown Spectroscopy (LIBS), comprising:
  a pulsed excitation laser,
  an instrument head comprising:
    a laser path channel,
    laser excitation optics arranged in said laser path channel,
    receiving optics for receiving emission from a sample plasma,
    an open-bottom chamber extending upwardly from a substantially flat bottom surface of the instrument head, said laser path channel extending to said chamber,
    at least one gas channel for feeding gas to said open-bottom chamber, wherein the pulsed excitation laser and laser excitation optics are configured such that when the instrument head is at a distance from a sample surface in the range of 1-10 mm, the focal point of the pulsed excitation laser is beneath the sample surface at a distance which is more than one Rayleigh length of the focused excitation laser beam.

10. The apparatus of claim 9, wherein said open-bottom chamber has a cross-sectional area in the range of 0.5 to 3 $cm^2$ and a height in the range of 5-15 mm.

11. The apparatus of claim 9, comprising a one or more pins or other discrete structural member extending downwardly from said substantially flat bottom surface, touching or penetrating the liquid metal surface of the sample when the apparatus is in measurement position.

12. The apparatus of claim 9, comprising a scraper, for skimming the sample surface.

13. The apparatus of claim 9, comprising a sample crucible to receive and hold the sample.

14. The apparatus of claim 9, comprising a source of heat for providing heat to the sample.

15. The apparatus of claim 9, comprising a heat-resistant layer on the substantially flat bottom surface, said layer having a hole concentric with the open-bottom chamber, where the hole has the same size and shape as the cross-section of the chamber or a smaller or larger size.

16. The apparatus of claim 14, wherein said source of heat is a source of inductive heat comprising a substantially flat conductive heat element positioned underneath the sample crucible.

* * * * *